US011286981B2

(12) United States Patent
Sarlin

(10) Patent No.: US 11,286,981 B2
(45) Date of Patent: Mar. 29, 2022

(54) FLANGED BEARING OUTER RING UNIT

(71) Applicant: SKF Aerospace France S.A.S, Montigny-le-Bretonneux (FR)

(72) Inventor: Rémi Sarlin, Allex (FR)

(73) Assignee: SKF AEROSPACE FRANCE S.A.S, Montigny-le-Bretonneux (FR)

( * ) Notice: Subject to any disclaimer, the term of this patent is extended or adjusted under 35 U.S.C. 154(b) by 0 days.

(21) Appl. No.: 16/655,670

(22) Filed: Oct. 17, 2019

(65) Prior Publication Data

US 2020/0124089 A1 Apr. 23, 2020

(30) Foreign Application Priority Data

Oct. 22, 2018 (FR) ...................................... 1859705

(51) Int. Cl.
*F16C 23/08* (2006.01)
*F16C 33/60* (2006.01)
(52) U.S. Cl.
CPC .......... *F16C 23/086* (2013.01); *F16C 23/084* (2013.01); *F16C 33/60* (2013.01)
(58) Field of Classification Search
CPC .... F16C 23/082; F16C 23/084; F16C 23/086; F16C 33/60; F16C 35/077; F16C 25/04
See application file for complete search history.

(56) References Cited

U.S. PATENT DOCUMENTS

| | | | | | |
|---|---|---|---|---|---|
| 3,224,821 | A | * | 12/1965 | Barr | F16C 33/62 384/484 |
| 3,873,167 | A | * | 3/1975 | Anderson | F16C 23/084 384/495 |
| 4,025,135 | A | * | 5/1977 | Hishida | F16C 13/006 384/498 |
| 4,668,110 | A | * | 5/1987 | Egeto | F16C 23/084 384/536 |
| 5,395,171 | A | * | 3/1995 | Waskiewicz | F16C 23/084 384/428 |
| 5,468,074 | A | * | 11/1995 | Godec | F16C 23/084 384/495 |
| 5,836,702 | A | * | 11/1998 | Whiddon | F16C 23/086 384/584 |

(Continued)

FOREIGN PATENT DOCUMENTS

| | | |
|---|---|---|
| DE | 102008007168 A1 | 8/2009 |
| EP | 0543777 A2 | 5/1993 |
| EP | 0789103 A2 * | 8/1997 ............ D06F 37/00 |

(Continued)

OTHER PUBLICATIONS

Search Report from the French Patent Office dated Sep. 10, 2019 in parent application No. FR 1859705, and translation thereof.

(Continued)

*Primary Examiner* — Phillip A Johnson
(74) *Attorney, Agent, or Firm* — J-Tek Law PLLC; Scoff T. Wakeman; Mark A. Ussai

(57) ABSTRACT

A flanged bearing outer ring unit includes an outer ring formed from metal and having a sliding interface and a polymeric flange attached to the sliding interface by over-molding and/or injection molding, and, optionally including an embedded metal or organo-sheet reinforcement. Also a method and a molding form for forming the flanged bearing outer ring unit.

14 Claims, 1 Drawing Sheet

(56) References Cited

U.S. PATENT DOCUMENTS

2013/0333511 A1   12/2013  Bussit et al.
2014/0314362 A1   10/2014  Bussit et al.

FOREIGN PATENT DOCUMENTS

| | | | | |
|---|---|---|---|---|
| EP | 1816360 A1 | 8/2007 | | |
| FR | 2220710 A1 | 10/1974 | | |
| GB | 2533304 A | 6/2016 | | |
| JP | S5962722 U | 4/1984 | | |
| JP | H0614539 U | * 2/1994 | ............ | F16C 33/588 |
| JP | 2009144813 A | 7/2009 | | |
| JP | 2010084817 A | 4/2010 | | |
| WO | WO-2006108389 A1 | * 10/2006 | ............ | F16C 23/045 |

OTHER PUBLICATIONS

Search Report from the British Patent Office dated Jan. 6, 2020 in related application No. GB1911228.3.

* cited by examiner

FLANGED BEARING OUTER RING UNIT

CROSS-REFERENCE

This application claims priority to French patent application no. 1859705 filed on Oct. 22, 2018, the contents of which are fully incorporated herein by reference.

TECHNOLOGICAL FIELD

The present disclosure is directed to a flanged bearing outer ring unit.

BACKGROUND

Flanged bearings may be used for self-aligning a bearing via a flange in its end position, which means that a flange is connected to the bearing to allow the self-alignment of the bearing. Therefore, a sliding interface exists between the rolling bearing and the flange. For example, in the aerospace industry, inter alia, in applications such as flight commands, power transmission, actuators, etc., such flanged bearings may be implemented as lightweight bearings. These lightweight flanged bearings usually have a thin flange which is either an extension of the outer ring of the bearing or an extension of an external ring of a spherical plain bearing containing the rolling bearing itself.

The flange is usually made of machined steel and is only a few millimeters thick. After milling or turning of the machined steel, the flange may be ground to produce a desired right surface roughness and geometry at the sliding interface. Thus, when machining these flanges, a lot of material is typically wasted to achieve the required thin geometry. Furthermore, when using a steel flange that is not made from stainless steel, the surface may have to be protected against corrosion, which requires a specific coating.

SUMMARY

It is thus an aspect of the present disclosure to provide an outer ring for a bearing which has a sliding interface with a flange for self-alignment, wherein the manufacturing of the flange is simplified and provides less material waste.

The disclosed flanged bearing outer ring unit comprises an outer ring made of metal and a flange attached to a sliding interface of the outer ring. In order to reduce material waste, the flange is made of a polymeric material and is attached to the sliding interface by injection molding. As the flange can be formed by injection molding directly around and at the outer ring, the flange can be molded in the intended final form, without needing to remove material, for example by grinding. Further, grinding would be a more cost and time expensive method. Further, as the flange comprises a polymeric material, there is no need for a further specific coating in order to protect the flange against corrosion, in contrast to a steel flange.

The polymeric material may be a thermoplastic material, for example polyether ether ketone (PEEK). It is known that thermoplastic material does not necessarily bond to metals when injected. When forming the flange around the outer ring, which is made of metal, the thermoplastic material is injected into a molding form. In the molding form, the thermoplastic material surrounds the outer ring. Between the thermoplastic and the outer ring in the form of a metal sphere, a ball joint is formed when the metal sphere slides inside the cavity formed by the thermoplastic after molding. There is no need of further grinding the thermoplastic material of the flange to get the right adjustment. The assembly is already done without any further manufacturing steps, whereas, when a steel flange is machined, further accomplishing or finishing steps would be needed.

By using a thermoplastic polymer as a polymeric material for the flange, a lightweight flange, and thus bearing, may be formed. In order to enhance the stability of the flange, the polymeric material may be reinforced by fibers, for example glass or carbon fibers.

In one embodiment, the polymeric material may be reinforced by using an embedded sheet metal or organo-sheet which may be a pre-consolidated sheet of thermoplastic material being reinforced with layers of fibers. The fibers may be glass or carbon fibers.

The organo-sheet may be cut, warmed up and immediately placed into the molding form, where the organo-sheet fills a fraction of the cavity in which the flange will be formed. Subsequently, the cavity is filled with the polymeric material which molds around the organo-sheet. As the organo-sheet has greater performances in term of strength and stiffness than the polymeric, for example thermoplastic, material. Thus, the level of performance in terms of strength and stiffness of the flange may be improved.

By forming a flanged bearing outer ring unit using injection molding, the weight of the full bearing may be reduced as lighter materials are used. Further, the cost of manufacturing the bearing may be reduced as the manufacturing of the polymeric flange is easier and faster compared to the manufacturing of a metal flange. Moreover, injection molding may allow the manufacture shapes that cannot be obtained by turning.

In a further aspect, a molding form for producing a flanged bearing outer ring unit as described above is provided. The molding form comprises a first molding part and a second molding part. The first molding part, the second molding part and the outer ring form a cavity which can be filled with a polymeric material for overmolding a flange to the sliding interface of the outer ring as described above.

The first molding part and the second molding part may be set on top of each other forming the cavity in between. One of the parts may comprise an opening for receiving an injection device containing the polymeric material and being adapted to inject the polymeric material. The outer ring may close one side of the cavity such that the injected polymeric material may overmold to the sliding interface of the outer ring. Further, the molding form may be filled with an organo-sheet before the injection of the polymeric material in order to provide a reinforced flange.

According to a further aspect, a bearing assembly is provided which comprises an inner ring and a flanged bearing outer ring unit as described above. Rolling elements are arranged between the inner ring and the flanged bearing outer ring unit, wherein a sliding interface is provided between the flange of the flanged bearing outer ring unit and the outer ring. As described above, such a bearing assembly may be a lightweight assembly as the flange is made of polymeric material instead of steel. Further, the manufacturing costs of the whole bearing assembly may be reduced compared to bearing assemblies having steel flanges as the manufacturing can be simplified. It is no longer necessary to remove material from the outer ring to form a flange and thus machining and grinding steps can be omitted.

According to a further aspect, a method for manufacturing a flanged bearing outer ring unit as described above is provided. First, an outer ring is provided which can be manufactured using machining, heat treatment, grinding, and if necessary surface treatment to provide a bearing outer ring with a truncated spherical outer surface.

The outer ring is then placed in a molding form as described above, and the molding form is closed by the outer ring, the first molding part and the second molding part. An injection device may be coupled with the molding form for filling the cavity of the molding form with a polymeric material. Once the polymeric, for example thermoplastic, material has cooled down to freezing temperature, at which time the assembly may be referred to as a "flanged bearing outer ring unit assembly," the flanged bearing outer ring unit may be demolded by removing the first molding part and the second molding part. After this step, the flanged bearing outer ring unit is composed of the bearing outer ring embedded into the polymeric flange.

According to a further aspect, a method for manufacturing a bearing assembly is provided. In addition to the steps of manufacturing the flanged bearing outer ring unit described above, the method for manufacturing the bearing assembly comprises the further step of assembling the rolling elements and the inner ring into the outer ring of the flanged bearing outer ring unit.

Further advantages and preferred embodiments are disclosed in the claims, the description and the figures. It should be further noted that a person skilled in the art may regard or use the presented features individually or combine the presented features otherwise than indicated without extending the scope of the invention.

In the following, the present invention will be described by means of embodiments shown in the figures. The shown embodiments are exemplarily, only, and are not intended to limit the scope of protection. The scope of protection is solely defined by the attached claims.

DETAILED DESCRIPTION

Figure 1:
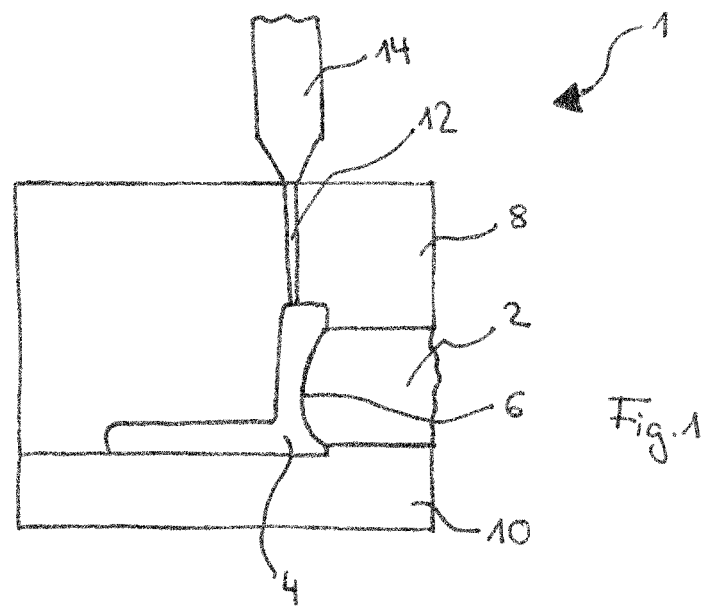
FIG. 1 is a cross sectional view of a molding form for manufacturing a flanged bearing outer ring unit according to the present disclosure.

In the following same or similar functioning elements are indicated with the same reference numerals.

FIG. 1 shows a molding form 1 for producing a flanged bearing outer ring unit. The flanged bearing outer ring unit includes an outer ring 2 and a flange 4 attached to a sliding interface 6 of the outer ring 2.

The molding form 1 comprises a first molding part 8 and a second molding part 10. The first molding part 8 and the second molding part 10 are set on top of each other. One side of the molding form 1 is closed by the outer ring 2, as shown in FIG. 1.

After putting together the molding form 1, a polymeric material is filled into the cavity formed between the first molding part 8, the second molding part 10 and the outer ring 2. The polymeric material, for example a thermoplastic material, is injected via an opening 12 formed in the first molding part 8. An injection device 14 may be used for injecting the polymeric material which injection device can be coupled to the opening 12.

After the polymeric material is filled into the cavity, the polymeric material is cooled. Because the sliding interface 6 forms one side of the cavity, the polymeric material is directly molded onto the sliding interface 6. After the polymeric material has completely cooled down, in particular cooled down to freezing temperature, the flanged bearing outer ring unit 16 is demolded by removing the first molding part 8 and the second molding part 10.

As a final step, rolling elements and an inner ring can be mounted to the outer ring 2 of the flanged bearing outer ring unit 16 for manufacturing a complete bearing assembly.

The flange 4 can thus be easily attached to the sliding interface 6 of the outer ring 2 for allowing a self-alignment of the outer ring 2. As the flange 4 is made of a polymeric material, the whole bearing assembly can be made lighter than a bearing assembly using a steel flange. Further, the manufacture of such a polymeric flange is easier than the manufacture of a steel flange because there is no need for further grinding the outer ring material to obtain the correct dimensions of the flange.

Figure 2:
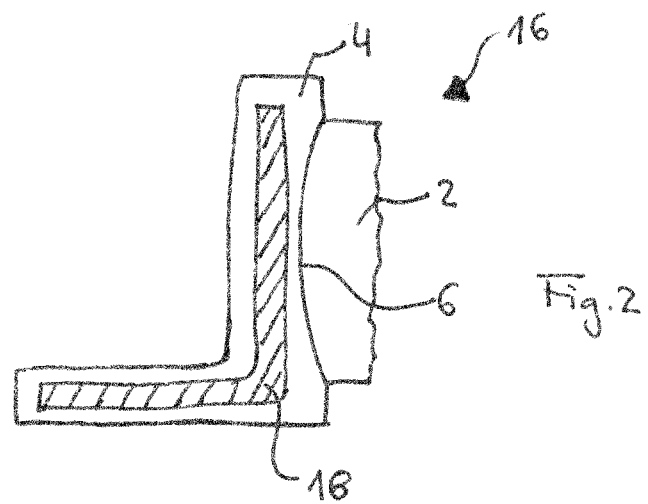
FIG. 2 is a cross sectional view of the flanged bearing outer ring unit of FIG. 1.

In order to reinforce the polymeric flange 4, an organo-sheet 18 may be embedded in the polymeric material as shown in FIG. 2. The organo-sheet 18 is a pre-consolidated sheet of thermoplastic material that is reinforced with layers of fibers, for example carbon or glass fibers.

The organo-sheet 18 may be placed into the molding form 1 before the molding form 1 is filled with the polymeric material. When the cavity of the molding form 1 is filled with the polymeric material, the polymeric material molds around the organo-sheet 18. By using such an organo-sheet 18, a higher degree of strength and stiffness may be added to the polymeric material, thus improving the strength and stiffness of the flange 4.

In summary, when a polymeric flange and an outer ring for a bearing which has a sliding interface with the polymeric flange for self-alignment is manufactured as described above, the manufacturing may be simplified and the material waste may be reduced as no grinding etc. on the flange is necessary.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved flanged outer bearing rings.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMERAL LIST 1 molding form
2 outer ring
4 flange
6 sliding interface
8 first molding part
10 second molding part
12 opening
14 injection device
16 flanged bearing outer ring unit
18 organo-sheet

What is claimed is:

1. A flanged bearing outer ring unit assembly comprising:
an outer ring comprising metal and having a sliding interface;
a polymeric flange; and
an injection molding form attaching the polymeric flange to the sliding interface,
wherein the siding interface is curved and the polymeric flange has a curved surface in direct contact with the sliding interface,
wherein the polymeric flange has a first leg having the curved surface and a second leg substantially perpendicular to the first leg, and
wherein a reinforcing sheet is provided inside the polymeric flange, the reinforcing sheet having a first portion in the first leg and a second portion in the second leg.

2. The flanged bearing outer ring unit assembly according to claim 1, wherein the polymeric material is a thermoplastic material.

3. The flanged bearing outer ring unit assembly according to claim 1, wherein the polymeric material is fiber reinforced.

4. The flanged bearing outer ring unit assembly according to claim 3, wherein the reinforcing sheet is a metal sheet or a pre-consolidated sheet of thermoplastic material with layers of fibers.

5. The flanged bearing outer ring unit assembly according to claim 3, wherein the polymeric material is reinforced by a pre-consolidated sheet of thermoplastic material with layers of fibers.

6. The flanged bearing outer ring unit assembly according to claim 1, wherein the polymeric material is a fiber reinforced thermoplastic material.

7. The flanged bearing outer ring unit assembly according to claim 1, wherein the reinforcing sheet is a metal sheet.

8. The flanged bearing outer ring unit assembly according to claim 1, wherein the reinforcing sheet is a pre-consolidated sheet of thermoplastic material with layers of fiber.

9. The flanged bearing outer ring unit according to claim 8, wherein the fibers are made of glass or carbon.

10. A flanged bearing outer ring unit assembly comprising:
an outer ring comprising metal and having a sliding interface; and
a polymeric flange attached to the sliding interface by injection molding,
wherein the polymeric material is reinforced by an organo-sheet, and
wherein the organo-sheet is a pre-consolidated sheet of thermoplastic material with layers of fibers.

11. The flanged bearing outer ring unit assembly according to claim 10, wherein the fibers are made of glass or carbon.

12. A method for manufacturing a flanged bearing outer ring unit comprising an outer ring comprising metal and having a sliding interface and a polymeric flange attached to the sliding interface, the method comprising:
providing the outer ring,
placing the outer ring in a molding form comprising a first molding part and a second molding part, wherein the first molding part, the second molding part and the outer ring form a cavity fillable with a polymeric material,
placing an organo-sheet in the cavity of the molding form, wherein the organo-sheet is a pre-consolidated sheet of thermoplastic material with layers of fibers,
after placing the organo-sheet in the cavity, filling the cavity of the molding form by injecting polymeric material into the cavity,
cooling the polymeric material, and
demolding the flanged bearing outer ring unit by removing the first molding part and the second molding part.

13. The method according to claim 12, further comprising:
assembling rolling elements and an inner ring into the outer ring of the flanged bearing outer ring unit to produce a bearing assembly.

14. The method according to claim 12, wherein the fibers are made of glass or carbon.

* * * * *